(12) United States Patent
Petiziol

(10) Patent No.: US 7,325,491 B2
(45) Date of Patent: Feb. 5, 2008

(54) MANUAL PRESS

(75) Inventor: Marco Petiziol, Maerne di Martellago (IT)

(73) Assignee: Macap S.R.L., Maerne Di Martellago (IT)

( * ) Notice: Subject to any disclaimer, the term of this patent is extended or adjusted under 35 U.S.C. 154(b) by 0 days.

(21) Appl. No.: 11/599,332

(22) Filed: Nov. 15, 2006

(65) Prior Publication Data

US 2007/0132164 A1 Jun. 14, 2007

(30) Foreign Application Priority Data

Dec. 13, 2005 (IT) .......................... VE2005A0061

(51) Int. Cl.
*B30B 1/00* (2006.01)
*A47J 31/00* (2006.01)

(52) U.S. Cl. ........................ 100/265; 100/219; 99/275; 99/279

(58) Field of Classification Search ................ 100/214, 100/219, 229 A, 230, 260, 265, 266, 280; 99/287, 349, 571, 577, 578, 275, 279
See application file for complete search history.

(56) References Cited

U.S. PATENT DOCUMENTS

| | | | | |
|---|---|---|---|---|
| 3,339,476 A | * | 9/1967 | De Troya | 99/287 |
| 4,838,155 A | * | 6/1989 | Steffel | 99/572 |
| 6,237,476 B1 | * | 5/2001 | Beauchemin | 99/571 |
| 2001/0011502 A1 | * | 8/2001 | Bonanno | 99/302 R |
| 2004/0206243 A1 | * | 10/2004 | Foster et al. | 99/279 |
| 2005/0132890 A1 | * | 6/2005 | Constantine et al. | 99/275 |

* cited by examiner

*Primary Examiner*—Jimmy T. Nguyen
(74) *Attorney, Agent, or Firm*—Hoffman, Wasson & Gitler

(57) ABSTRACT

A manual press for coffee, made from a plate rigid with a stem axially slidable within a first sleeve, members enabling the stem to removably engage a first sleeve, a second sleeve acting on the removable engagement members, a shell internally housing the first sleeve and second sleeve and provided with an operating knot, first elastic device which, when the press is not in use, acts on the second sleeve which maintains the members in the condition under which the stem engages the first sleeve.

7 Claims, 6 Drawing Sheets

MANUAL PRESS

BACKGROUND OF THE INVENTION

The present invention relates to a manual press.

Manual presses used to compress the coffee contained in the filter holder are known.

These known presses present the drawback that the coffee pressure is related to the force with which the user presses on the coffee and hence are unable to ensure repetition of pressing conditions with time.

SUMMARY OF THE INVENTION

According to the invention this drawback is eliminated by a manual press for coffee having:

a plate rigid with a stem axially slidable within a first sleeve, members enabling said stem to removably engage said first sleeve, a second sleeve acting on said removable engagement members, a shell internally housing said first sleeve and second sleeve and provided with an operating knob (38), first elastic means which, when the press is not in use, act on said second sleeve which maintains said members in the condition under which said stem engages said first sleeve, second elastic means which when not in use maintain the discoidal plate at its greatest distance from the knob, third elastic means acting on the stem when, following the pressing of the knob during the use of the press, the engagement members enable the stem to slide relative to the first sleeve, said first elastic means having a rigidity constant less than the second elastic means, said third elastic means having a rigidity constant between that of the first and the second elastic means, said engagement members again locking said stem to said first sleeve when there is no pressing action on the knob towards the discoidal plate and the elastic reaction of the third elastic means returns the knob into its position of greatest distance from the discoidal plate, and said first elastic means) acting on said second sleeve to return the press to its rest configuration.

BRIEF DESCRIPTION OF THE DRAWINGS

A preferred embodiment of the present invention is further clarified hereinafter with reference to the accompanying drawings, in which.

DETAILED DESCRIPTION OF THE INVENTION

Figure 1:
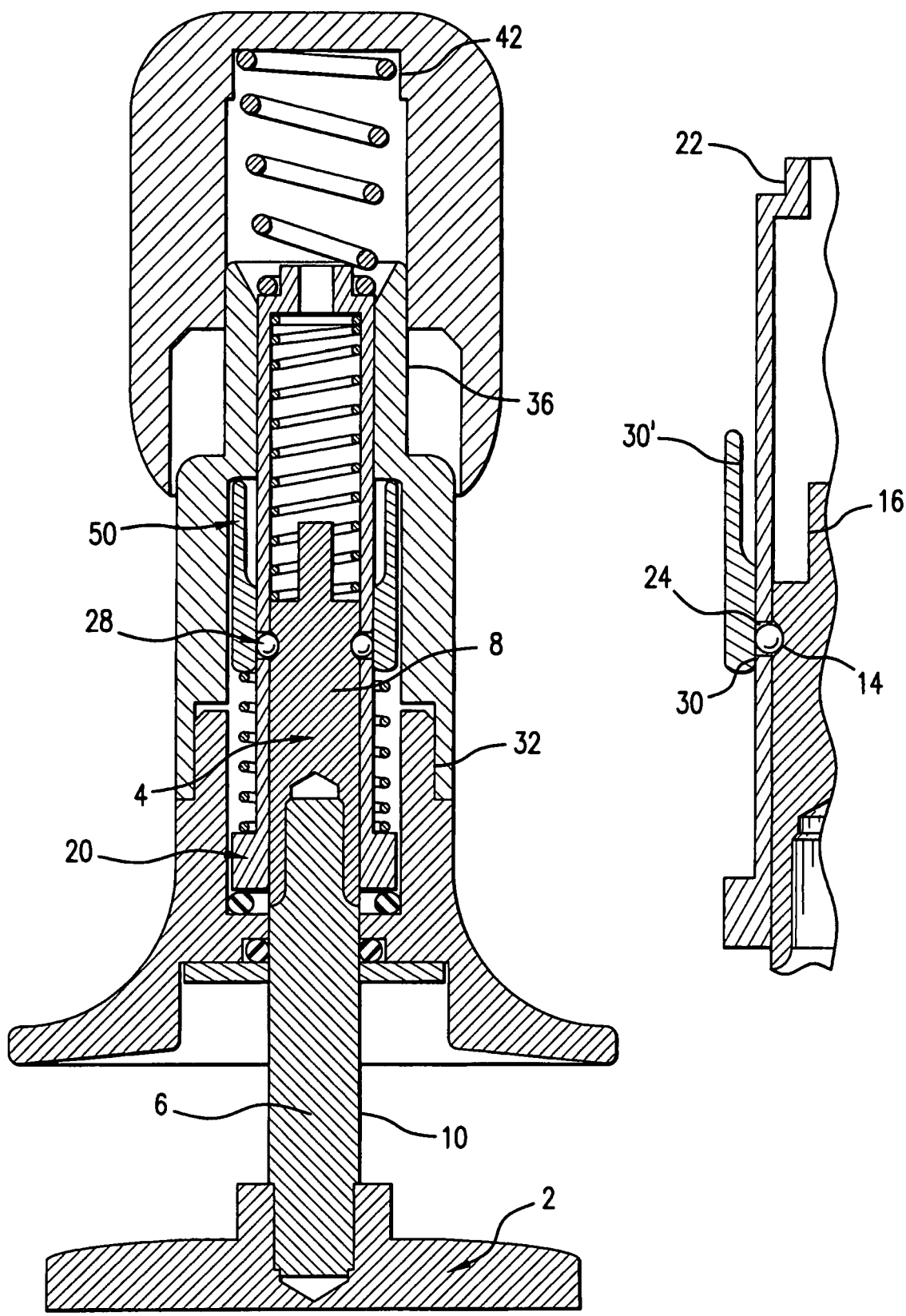
FIG. 1 is a longitudinal section through a press of the invention in its rest configuration.

As can be seen from the figures, the manual press of the invention comprises substantially a discoidal part 2 into which a stem 4 consisting of two respective portions 6, 8 is screwed.

The portion 6 is of cylindrical shape with two parallel flat surfaces 10 and is inserted into a corresponding seat provided in a horn-shaped body 12.

The portion 8 comprises an annular groove 14 and terminates upperly in a pin 16 which engages the interior of a helical spring 18. The spring is housed in a sleeve 20 which upperly comprises a stepped portion 22 and is provided in its lateral surface with six holes 24, which under rest conditions face the annular groove 14.

Coaxially to the sleeve 20 there is applied a helical spring 26 presenting an elastic constant less than that of the spring 18.

When the press is not in use, corresponding balls 28 are inserted into the holes 24 and are kept locked in position by that portion 30 of lesser inner diameter of a sleeve 50 which upperly presents a portion 30' of greater inner diameter which rests on the spring 26.

The neck 32 of the horn portion 12 is externally threaded for engagement by a bush 34 provided upperly with a threaded collar 36 on which a knob 38 engages.

A third helical spring 40 of elastic constant greater than that of the spring 18 rests on the stepped portion 22 and is housed in an inner cavity 42 provided in the knob 38.

When the press is not in use, the rigidity of the spring 40 and of the spring 26 maintain the horn-shaped portion 12 vertically raised from the part 2 (see FIG. 1).

In this configuration the spring 26 urges the sleeve 50 upwards.

The press of the invention operates in the following manner:

the user rests the press on the coffee contained in the filter holder 52 and presses the knob 38 in the sense of causing this to approach the filter holder.

Figure 2:
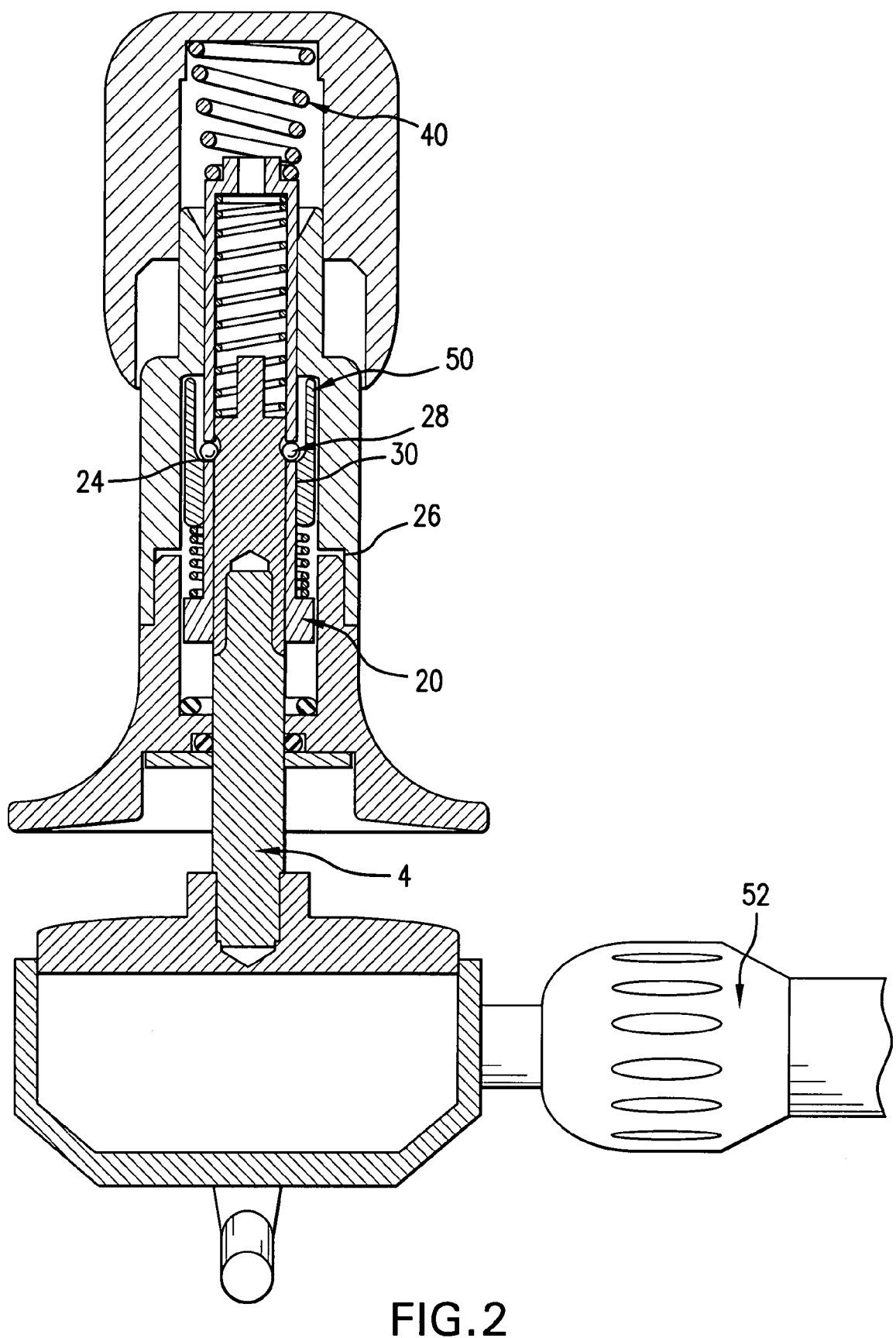
FIG. 2 shows it while pressing.

This operation compresses only the spring 26 and the spring 40, as the sleeve 20 and the stem 4 are mutually rigid because of the balls 28 securely housed in the holes 24 of the lesser diameter portion 30 of the sleeve 50 (see FIG. 2).

The end of the horn-shaped portion 12 is therefore able to approach the part 2 by virtue of the axial sliding of the horn 12—sleeve 50—knob 38—bush 34 system.

Figure 3:
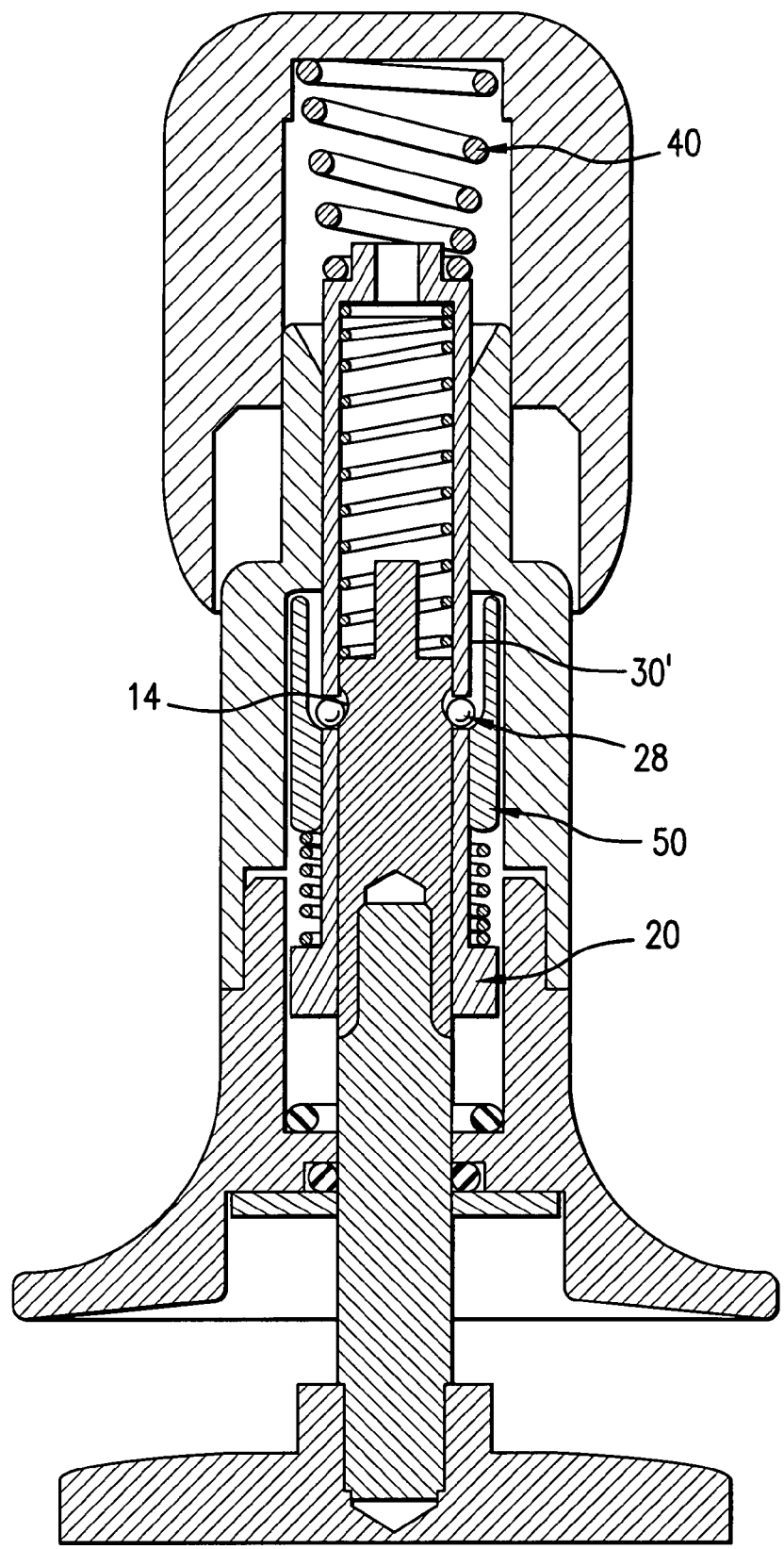
FIG. 3 shows it at a subsequent pressing stage.

As a result of this descent, the balls 28 become positioned in the greater diameter portion 30' of the sleeve 50 and leave their seats 14, so interrupting the pressure exerted by the spring 40 (see FIG. 3).

Figure 4:
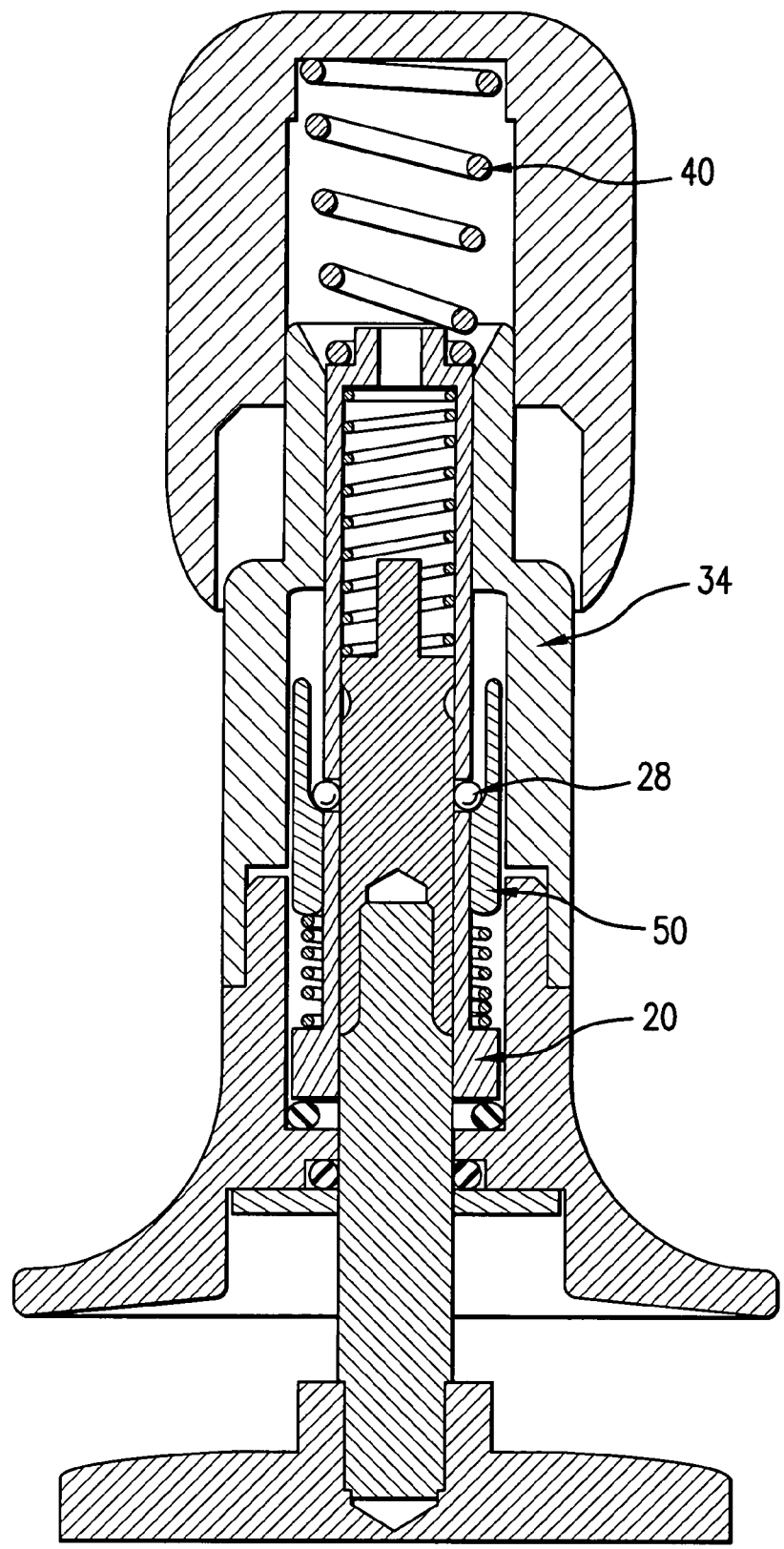
FIG. 4 shows it at a third pressing stage.

Following this disengagement, the spring 40 reacts against its initial compression, expands and urges the sleeve 20 which, because of the constraint due to the presence of the balls 28 (see FIG. 4), axially moves the sleeve 50 relative to the bush 34, to its rest position.

By further pressing on the knob, the spring 18 is compressed by the stem 4, with consequent approach of the press 2 to the horn-shaped body 12.

Figure 5:
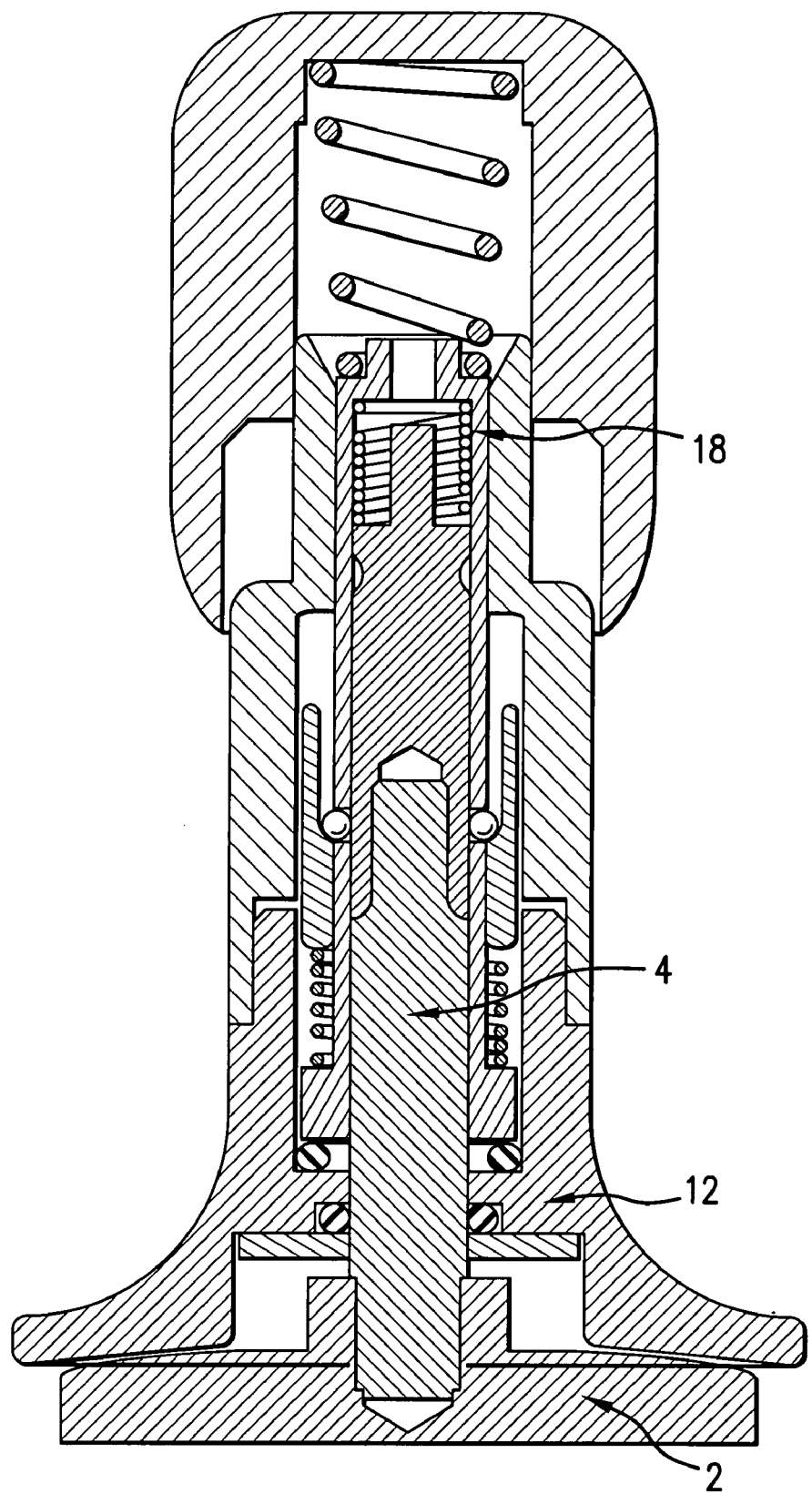
FIG. 5 shows it when maximum pressure has been reached.

Further pressing after the balls 28 have been released in no way influences the pressure exerted on the coffee by the press, as the spring 18 is of considerably less elastic rigidity than the spring 40 (see FIG. 5).

Figure 6:
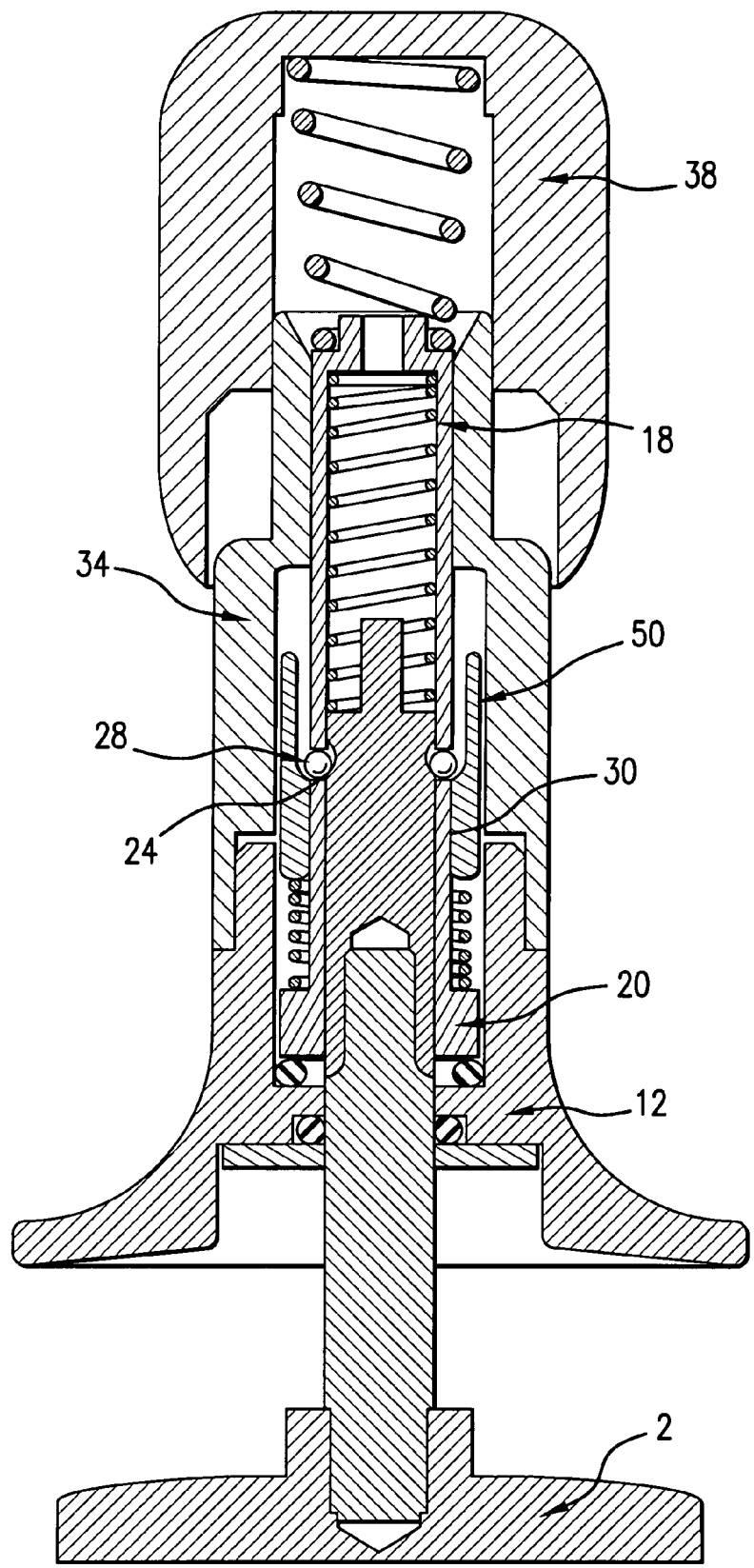
FIG. 6 shows it at the release stage.

When the knob 38 is released, the elastic reaction of the spring 18 prevails, this latter upwardly urging the horn 12—sleeve 50—bush 34—sleeve 20—knob 38—system so that the lesser diameter portion 30 of the sleeve 50 compels the balls 28 to again enter the annular groove 14 when these face each other (see FIG. 6).

At the moment in which the balls re-enter the groove, the sleeve 50, urged by the spring 26, is able to rise relative to the body (see FIG. 1).

The degree of compression of the spring 40 and hence the degree of pressing can be varied by varying the position of the knob on the bush 34 by its extent of screwing onto the collar 36.

What is claimed is:

1. A manual press for coffee, comprising:
   a discoidal plate is rigidly mounted to a stem, said stem axially slidable within a first sleeve,
   a plurality of removable engagement members enabling said stem to removably engage said first sleeve,
   a second sleeve acting on said removable engagement members,
   a shell internally housing said first sleeve and said second sleeve and provided with an operating knob,
   first elastic means which, when the press is not in use, act on said second sleeve which maintains said members in a condition under which said stem engages said first sleeve,
   second elastic means which when not in use maintain the discoidal plate at its greatest distance from the knob,
   third elastic means acting on the stem when, following the pressing of the knob during the use of the press, the engagement members enable the stem to slide relative to the first sleeve,
   said first elastic means having a rigidity constant less than the second elastic means, said third elastic means having a rigidity constant between that of the first and the second elastic means,
   said engagement members are configured to lock said stem to said first sleeve when there is no pressing action on the knob towards the discoidal plate and an elastic reaction of the third elastic means returns the knob into its position of greatest distance from the discoidal plate,
   said first elastic means acting on said second sleeve to return the press to its rest configuration.

2. The press as claimed in claim 1, wherein said stem consists of two portions.

3. The press as claimed in claim 1, wherein the shell has a horn-shaped lower end.

4. The press as claimed in claim 1, wherein the first, the second and the third elastic means are helical springs.

5. The press as claimed in claim 1, wherein said engagement members are balls insertable into an annular groove provided in the stem.

6. The press as claimed in claim 1, wherein said second sleeve is formed in two portions having different inner diameters.

7. The press as claimed in claim 1, wherein the operating knob is screwed to the shell.

* * * * *